(12) United States Patent
Stewart et al.

(10) Patent No.: US 8,167,978 B2
(45) Date of Patent: May 1, 2012

(54) GAS GENERATOR AND METHOD THEREFOR

(75) Inventors: Albert E. Stewart, Canoga Park, CA (US); Jeffrey A. Mays, Canoga Park, CA (US)

(73) Assignee: Pratt & Whitney Rocketdyne, Inc., Canoga Park, CA (US)

( * ) Notice: Subject to any disclaimer, the term of this patent is extended or adjusted under 35 U.S.C. 154(b) by 295 days.

(21) Appl. No.: 12/575,538

(22) Filed: Oct. 8, 2009

(65) Prior Publication Data
US 2010/0092382 A1    Apr. 15, 2010

Related U.S. Application Data

(60) Provisional application No. 61/104,043, filed on Oct. 9, 2008.

(51) Int. Cl.
*B01D 53/02* (2006.01)
(52) U.S. Cl. .................. 95/148; 96/130; 96/143
(58) Field of Classification Search .......... 95/96, 148; 96/130, 143
See application file for complete search history.

(56) References Cited

U.S. PATENT DOCUMENTS

| | | |
|---|---|---|
| 4,071,330 A | 1/1978 | Sederquist |
| 4,240,805 A | 12/1980 | Sederquist |
| 4,293,315 A | 10/1981 | Sederquist |
| 4,836,898 A | 6/1989 | Noyes |
| 5,012,037 A | 4/1991 | Doshi et al. |
| 5,089,034 A | 2/1992 | Markovs et al. |
| 5,726,327 A * | 3/1998 | Acharya et al. ............ 549/258 |
| 6,293,998 B1 | 9/2001 | Dolan et al. |
| 6,497,856 B1 | 12/2002 | Lomax, Jr. et al. |
| 6,623,719 B2 | 9/2003 | Lomax, Jr. et al. |
| 2004/0191166 A1 | 9/2004 | Hershkowitz et al. |

FOREIGN PATENT DOCUMENTS

| | | |
|---|---|---|
| EP | 0815920 | 7/1998 |
| GB | 1311360 | 3/1973 |

* cited by examiner

*Primary Examiner* — Robert A Hopkins
(74) *Attorney, Agent, or Firm* — Carlson Gaskey & Olds, P.C.

(57) ABSTRACT

A gas generator includes a high pressure gas-generation system that is capable of generating a product gas stream at a non-ambient, elevated nominal pressure. A thermal swing absorber has a first configuration and a second configuration relative to being connected with the product gas stream. In the first configuration, the thermal swing absorber is connected with the high pressure gas-generation system to receive the product gas stream and remove a constituent gas from the stream. In the second configuration, the thermal swing absorber is disconnected from the product gas stream and releases the constituent gas at a pressure that is substantially equal to the elevated nominal pressure. In the second configuration, the thermal swing absorber is an input source to provide the released constituent gas into the high pressure gas-generation system, which permits more efficient use of materials within the system.

26 Claims, 2 Drawing Sheets

GAS GENERATOR AND METHOD THEREFOR

CROSS-REFERENCE TO RELATED APPLICATION

The present disclosure claims benefit to Provisional Application Ser. No 61/104,043, filed on Oct. 9, 2008.

BACKGROUND

This disclosure relates to chemical devices for generating gases, such as hydrogen.

Reactor systems are known and used to synthetically produce useful gases, such as hydrogen. For instance, a hydrogen generation system may include a reaction vessel or chamber for reacting natural gas and steam feed materials in a known process to produce hydrogen. One challenge associated with such systems is that the product stream typically includes the product gas and unreacted feed materials, non-product elements, species originally in the feed materials, species produced in side reactions, or the like, which must be removed.

SUMMARY

A disclosed gas generator includes a high pressure gas-generation system that is capable of generating a product gas stream at a nonambient, elevated nominal pressure. A thermal swing absorber has a first configuration and a second configuration with regard to being connected with the product gas stream. In the first configuration, the thermal swing absorber is connected with the high pressure gas-generation system to receive the product gas stream and remove a constituent gas from the stream. In the second configuration, the thermal swing absorber is disconnected from the high pressure gas-generation system with regard to receiving the product gas stream and releases the constituent gas at a pressure that is substantially equal to the elevated nominal pressure of the product gas stream. The thermal swing absorber is connected in the second configuration to the high pressure gas-generation system as an input source to provide the released constituent gas as an input into the high pressure gas-generation system.

In another aspect, a disclosed gas generator may include a plurality of thermal swing absorbers each having the first configuration and the second configuration. The thermal swing absorbers may be diversely configured such that when some of the absorbers are in the first configuration others of the absorbers are in the second configuration.

A disclosed method of generating gas includes generating a product gas stream at a non-ambient, elevated nominal pressure using a high pressure gas-generation system. A constituent gas is removed from the product gas stream using a thermal swing absorber. In a second configuration, the thermal swing absorber releases the constituent gas at a pressure that is substantially equal to the elevated nominal pressure. The released constituent gas is fed as an input into the high pressure gas-generation system.

BRIEF DESCRIPTION OF THE DRAWINGS

The various features and advantages of the disclosed examples will become apparent to those skilled in the art from the following detailed description. The drawings that accompany the detailed description can be briefly described as follows.

DETAILED DESCRIPTION OF THE PREFERRED EMBODIMENT

Figure 1:
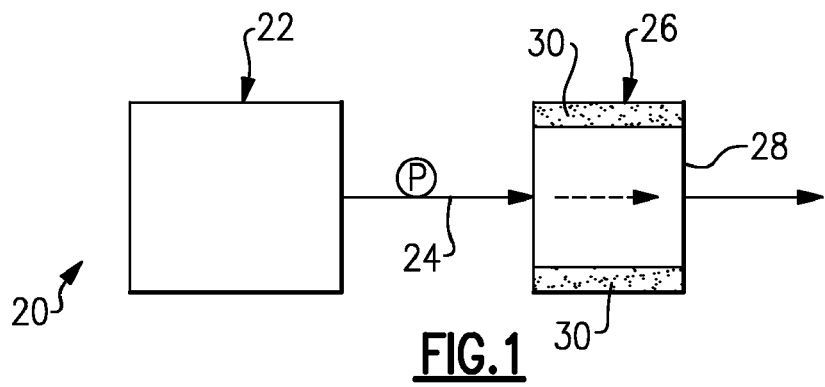
FIG. 1 illustrates an example gas generator having a high pressure gas-generation system and a thermal swing absorber in a first configuration.

FIG. 1 illustrates selected portions of an example gas generator 20 for producing a product gas, such as hydrogen. Although the examples herein may be made with reference to generating hydrogen, it is to be understood that the examples may be adapted for systems that produce other types of gases. In this case, the gas generator 20 includes a high pressure gas-generation system 22 that is capable of generating a product gas stream 24 at a nonambient, elevated nominal pressure, P. The high pressure gas-generation system 22 is shown simplistically but may include additional components that are known for such systems, such as hydrogen gas generator reactors and ancillary components.

The gas generator 20 includes a thermal swing absorber 26 that absorbs gas below a threshold temperature and desorbs or releases the gas above the threshold temperature. In this case, the thermal swing absorber 26 is dually configurable in a first configuration (FIG. 1) for receiving the product gas stream 24 and removing impurity gases from the stream and a second configuration (FIG. 2) for releasing the impurity gas as an input into the high pressure gas-generation system 22, as will be described in further detail below. The impurity gases are not limited to any particular type and may depend on the type of gas generator 20, but may include unreacted feed materials, non-product elements, species originally in the feed materials, species produced in side reactions, or the like.

The thermal swing absorber 26 may include a vessel 28 that may be selectively connected or disconnected with the product gas stream 24 using known type of connectors. The vessel 28 may also be completely sealed from the surrounding ambient environment for purposes of moving the thermal swing absorber 26 between the first configuration and the second configuration.

The thermal swing absorber 26 includes a sorbent material 30, such as activated carbon or other known type of sorbent, which is capable of absorbing impurity gases in the product gas stream 24. For hydrogen generation, activated carbon is suitable for absorbing carbon dioxide and methane impurity gases from the product gas stream 24.

The gas generator 20 is a high pressure system that operates at the nonambient, elevated nominal pressure P. For instance, the elevated nominal pressure may be several orders of magnitude greater than the ambient surroundings. In some examples, the elevated nominal pressure may be around 120 pounds per square inch (approximately 0.827 megapascals). Generally, not all gas generator systems operate at elevated pressures. In this case, the components of the gas generator 20 may be fabricated in a robust manner in order to contain the elevated nominal pressure. As will be described in more detail below, the thermal swing absorber 26 provides the benefit of absorbing impurity gases from the high pressure product gas stream 24 and then later releasing the absorbed gases at a pressure that is substantially equal to the elevated nominal pressure P of the system. In this regard, the released gas may be introduced back into the high pressure gas-generation system 22 without the need to pressurize the released gas using additional equipment, such as compressors or other components that would add complexity and the cost to the system. As such, the released gas at the elevated nominal pressure P may be fed into any of various different components in the gas generator 20, and need not be used solely for use as a fuel.

Figure 2:
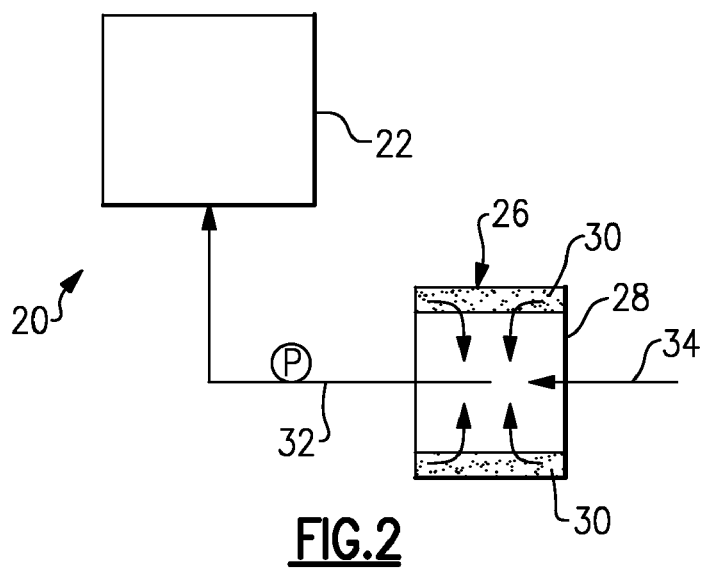
FIG. 2 illustrates the gas generator with the thermal swing absorber in a second configuration.

FIG. 2 illustrates the thermal swing absorber 26 in the second configuration. The thermal swing absorber 26 is disconnected from the high pressure gas-generation system 22 with regard to receiving the product gas stream 24. In this configuration, the thermal swing absorber 26 releases the absorbed gas (as indicated by the arrows from the sorbent material 30). The released gas is provided as an input stream 32 into the high pressure gas-generation system 22. The input stream 32 is at a pressure P' that is substantially equal to the pressure P of the product gas stream 24. As indicated above, the substantially equal pressure P' of the input stream 32 provides the ability to directly feed the input stream 32 into the high pressure gas-generation system 22 without the need for pressurization.

To release the absorbed gas, the thermal swing absorber 26 may be heated to a release temperature. As an example, the release temperature may be about 450-600° F. (approximately 232-316° C.). The thermal swing absorber 26 may be heated in any suitable manner. In one example, steam may be used as sweep gas or purge 34 to heat the sorbent material 30 of the thermal swing absorber 26. For a hydrogen generation system, a reactant feed material may be steam. In this regard, steam that is already produced for input into the gas generator 20 may be used as the sweep gas or purge 34. Alternatively, if the input stream 32 is to be used in a calciner, a fuel gas for the calciner may be used as the sweep gas.

Upon reaching the release temperature, the sorbent material 30 releases any absorbed gas into the vessel 28 of the thermal swing absorber 26. In this case, the thermal swing absorber 26 may be sealed and isolated during heating and then later connected to the high pressure gas-generation system 22 with the purge 34 to provide the input stream 32. Alternatively, the thermal swing absorber 26 may be connected to the high pressure gas-generation system 22 while the purge 34 is provided such that the sorbent material 30 releases absorbed gas and simultaneously provides the input stream 32.

Figure 3:
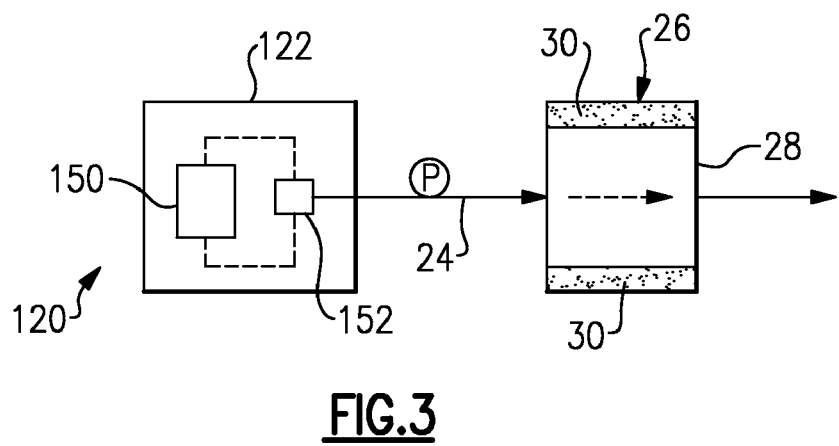
FIG. 3 illustrates another example gas generator with a thermal swing absorber in a first configuration.

FIG. 3 illustrates another example gas generator 120 that is somewhat similar to the gas generator 20 of the previous examples. In this disclosure, like reference numerals designate like elements where appropriate, and reference numerals with the addition of one-hundred or multiples thereof designate modified elements. The modified elements are understood to incorporate the same features and benefits of the corresponding original elements. In this case, the thermal swing absorber 26 is shown in the first configuration. A high pressure gas-generation system 122 includes a sorbent-assisted fluidized bed reactor 150 (i.e., reactor 150) and a calciner 152 that is operatively connected with the reactor 150. As an example, the reactor 150 may include a vessel for receiving feed materials to generate a product gas stream that includes hydrogen gas. The feed materials may include a sorbent, such as calcium oxide, which facilitates the reaction between the feed materials. The calcium oxide absorbs product carbon dioxide in the reaction and thereby facilitates pushing the reaction forward.

The calciner 152 receives spent sorbent material from the reactor 150 and flash heats the sorbent to release the carbon dioxide and thereby regenerate the sorbent. The sorbent is then reintroduced as a feed material into the reactor 150 in a known manner. The sorbent material may first be separated from the product gas stream 24 prior to calcination such that the product gas stream does not go through the calciner 152.

Figure 4:
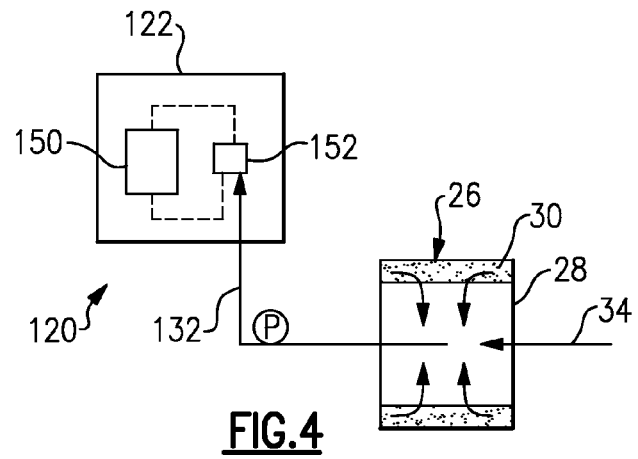
FIG. 4 illustrates the gas generator of FIG. 3 with the thermal swing absorber in a second configuration

In the second configuration shown in FIG. 4, the thermal swing absorber 26 is connected with the high pressure gas-generation system 122, as described above. In this case, the input stream 132 is provided to the calciner 152 such that the thermal swing absorber 26 is an input source of fuel into the calciner 152. In this regard, the input stream 132 may be injected directly into the calciner 152 as a fuel for heating the spent sorbent material. As described above, the input stream 132 is at a pressure P' that is substantially equal to the pressure P of the product gas stream 24. Thus, the input stream 132 may be provided directly into the calciner 152 without first being pressurized to the level of the high pressure gas-generation system 122.

Figure 5A:
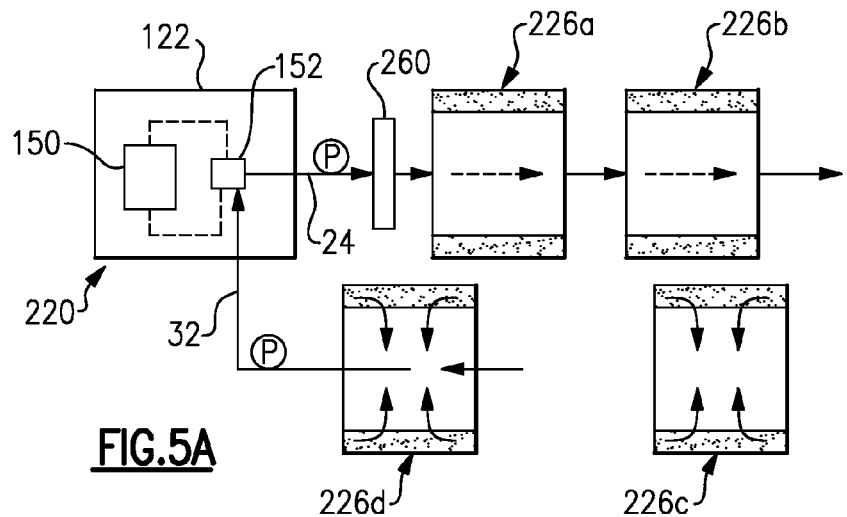
FIG. 5A illustrates another example gas generator having a plurality of thermal swing absorbers in first and second configurations.

FIG. 5A illustrates another example gas generator 220 that uses multiple thermal swing absorbers 226a-d. In this case, the gas generator 220 is a hydrogen generation system that also includes a methanator 260 that is configured with a catalyst to convert residual carbon oxides in the product gas stream 24 into methane. The thermal swing absorbers 226a-d absorb the methane downstream from the methanator 260. In this regard, the gas generator 220 can be operated to produce the product gas stream 24 with the impurity being substantially all methane and very little byproduct carbon dioxide or carbon monoxide. Thus, the conversion of carbon oxides to methane facilitates providing a greater return of unreacted feed material to the gas generator 220 and thereby increases yield.

Figure 5B:
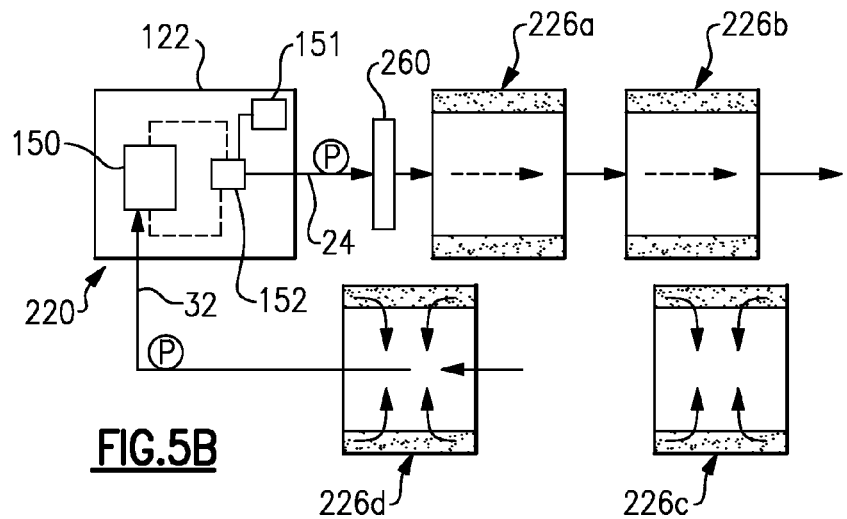
FIG. 5B illustrates a modified example of the gas generator of FIG. 5A.

As shown in the modified example of FIG. 5B, the input stream 132 may alternatively be provided as a feed to the reactor 150. By providing the input stream 132 to the reactor 150 as a feed rather than as a fuel gas to the calciner 152, a less expensive and different type of fuel gas from fuel gas source 151 may be used in the calciner 152 for calcination. The economics of the process is thereby increased by the more efficient utilization of feed material for producing product hydrogen (rather than heating the system) at increased yields approaching stoichiometric production of four hydrogen atoms per one methane molecule while heat to drive the calcination process is provided by a non-feed, less expensive fuel. In a modification, not all of the thermal swing absorbers 226a-d need not be associated with the methanator 260.

Each of the thermal swing absorbers 226a-d has a first configuration and a second configuration, similar to as described above. In this case, however, the thermal swing absorbers 226a-d are diversely configured such that when some of the thermal swing absorbers 226a-d are in the first configuration, others of the thermal swing absorbers 226a-d are in the second configuration. In this case, thermal swing absorbers 226a and 226b are in the first configuration and thermal swing absorber 226d is in the second configuration. That is, the thermal swing absorbers 226a-d may be moved between the first configuration and the second configuration to continuously absorb the impurity gases from the product gas stream 24 and provide the input stream 32 to the calciner 152.

In the illustrated example, the thermal swing absorber 226c is in an intermediate configuration between the first configuration and the second configuration. In this case, the thermal swing absorber 226c may be cooling down after the release of its absorbed gases before being reconnected to the product gas stream 24. In another example, the thermal swing absorber 226c may be in the process of being heated to release its absorbed gases before being connected to the input stream 32. The number of thermal swing absorbers 226a-d selected for use in the gas generator 220 may be fewer or more than shown, depending upon the size of the system.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A gas generator comprising:
a high pressure gas-generation system including a fluidized-bed reactor capable of generating a product gas stream at a non-ambient, elevated nominal pressure;
a thermal swing absorber having a first configuration and a second configuration with regard to being connected with the product gas stream, in the first configuration the thermal swing absorber is connected with the high pressure gas-generation system to receive the product gas stream and remove a constituent gas therefrom, and in the second configuration the thermal swing absorber is disconnected from the high pressure gas-generation system with regard to receiving the product gas stream and releases the constituent gas at a pressure that is substantially equal to the elevated nominal pressure, the thermal swing absorber being connected to the high pressure gas-generation system as an input source when in the second configuration to provide the released constituent gas as an input into the high pressure gas-generation system; and
a methanator arranged upstream from the thermal swing absorber when the thermal swing absorber is in the first configuration and downstream from the fluidized-bed reactor to receive the product gas stream therefrom, the methanator including a catalyst capable of converting carbon oxides in the product gas stream into methane.

2. The gas generator as recited in claim 1, wherein the high pressure gas-generation system includes a sorbent-assisted fluidized bed reactor and a calciner.

3. The gas generator as recited in claim 2, wherein the thermal swing absorber is connected to the calciner when in the second configuration to provide the released constituent gas as the input into the calciner.

4. The gas generator as recited in claim 2, wherein the thermal swing absorber is connected to the sorbent-assisted fluidized bed reactor when in the second configuration to provide the released constituent gas as the input into the sorbent-assisted fluidized bed reactor.

5. The gas generator as recited in claim 1, wherein the thermal swing absorber includes a sorbent material.

6. The gas generator as recited in claim 5, wherein the sorbent material comprises activated carbon.

7. The gas generator as recited in claim 1, wherein the thermal swing absorber is capable of absorbing constituent gas at a first temperature and releasing absorbed a gas at a second temperature that is greater than the first temperature.

8. The gas generator as recited in claim 1, including a steam sweep gas source connected to the thermal swing absorber when in the second configuration to heat and purge the thermal swing absorber.

9. The gas generator as recited in claim 1, wherein the fluidized-bed reactor includes a sorbent.

10. The gas generator as recited in claim 9, wherein the sorbent includes calcium oxide.

11. A gas generator comprising:
a high pressure gas-generation system capable of generating a product gas stream at a non-ambient, elevated nominal pressure, the high pressure gas-generation system including a sorbent-assisted fluidized bed reactor and a calciner;
a thermal swing absorber having a first configuration and a second configuration with regard to being connected with the product gas stream, in the first configuration the thermal swing absorber is connected with the high pressure gas-generation system to receive the product gas stream and remove a constituent gas therefrom, and in the second configuration the thermal swing absorber is disconnected from the high pressure gas-generation system with regard to receiving the product gas stream and releases the constituent gas at a pressure that is substantially equal to the elevated nominal pressure, the thermal swing absorber being connected to the high pressure gas-generation system as an input source when in the second configuration to provide the released constituent gas as an input into the high pressure gas-generation system, wherein the thermal swing absorber is connected to the sorbent-assisted fluidized bed reactor when in the second configuration to provide the released constituent gas as the input into the sorbent-assisted fluidized bed reactor; and
a gas source connected with the calciner for providing a different type of gas to the calciner than the released constituent gas.

12. A gas generator comprising:
a high pressure gas-generation system capable of generating a product gas stream at a non-ambient, elevated nominal pressure, the high pressure gas-generation system including a sorbent-assisted fluidized bed reactor and a calciner downstream from the sorbent-assisted fluidized bed reactor and operable to regenerate spent sorbent from the sorbent-assisted fluidized bed reactor; and
a plurality of thermal swing absorbers each having a first configuration and a second configuration with regard to being connected with the product gas stream, in the first configuration the respective thermal swing absorber is connected with the high pressure gas-generation system to receive the product gas stream and remove a constituent gas therefrom, and in the second configuration the respective thermal swing absorber is disconnected from the high pressure gas-generation system with regard to receiving the product gas stream and releases the constituent gas at a pressure that is substantially equal to the elevated nominal pressure, the respective thermal swing absorber being connected to the high pressure gas-generation system as an input source when in the second configuration to provide the released constituent gas as an input into the high pressure gas-generation system, and the plurality of thermal swing absorbers are diversely configured such that when some of the plurality of thermal swing absorbers are in the first configuration others of the plurality of thermal swing absorbers are in the second configuration.

13. The gas generator as recited in claim 12, wherein the plurality of thermal swing absorbers are connected to the calciner when in the second configuration.

14. The gas generator as recited in claim 12, wherein the high pressure gas-generation system includes a methanator that is arranged upstream from the plurality of thermal swing absorbers when in the first configuration.

15. The gas generator as recited in claim 12, wherein each of the plurality of thermal swing absorbers includes a sorbent material.

16. The gas generator as recited in claim 15, wherein the sorbent material is activated carbon.

17. The gas generator as recited in claim 12, wherein each of the plurality of thermal swing absorbers is capable of absorbing the constituent gas at a first temperature and releasing absorbed gas at a second temperature that is greater than the first temperature.

18. The gas generator as recited in claim 14, wherein the methanator is arranged upstream from the respective thermal swing absorber when the thermal swing absorber is in the first configuration and downstream from the sorbent-assisted fluidized-bed reactor to receive the product gas stream therefrom, the methanator including a catalyst capable of converting carbon oxides in the product gas stream into methane.

19. The gas generator as recited in claim 12, wherein the sorbent-assisted fluidized-bed reactor includes a calcium oxide sorbent.

20. A method of generating a gas, comprising:
generating a product gas stream at a non-ambient, elevated nominal pressure using a fluidized-bed reactor of a high pressure gas-generation system;
converting carbon oxides in the product gas stream into methane using a catalyst-containing methanator arranged downstream from the fluidized-bed reactor;
removing a constituent gas from the product gas stream using a thermal swing absorber in a first configuration arranged to receive the product gas stream from the methanator;
releasing the constituent gas from the thermal swing absorber in a second configuration and at a pressure that is substantially equal to the elevated nominal pressure; and
feeding the released constituent gas as an input into the high pressure gas-generation system.

21. The method as recited in claim 20, wherein the removing of the constituent gas includes absorbing the constituent gas at a first temperature, and the releasing of the constituent gas includes releasing at a second temperature that is greater than the first temperature.

22. The method as recited in claim 20, including feeding the released constituent gas to a calciner of the high pressure gas-generation system.

23. The method as recited in claim 20, further including purging the thermal swing absorber with a heated sweep gas.

24. The method as recited in claim 20, further including purging the thermal swing absorber with steam.

25. The method as recited in claim 20, wherein the constituent gas that is removed from the product gas stream using the thermal swing absorber in the first configuration is methane.

26. A method of generating a gas, comprising:
generating a product gas stream at a non-ambient, elevated nominal pressure using a high pressure gas-generation system;
removing a constituent gas from the product gas stream using a thermal swing absorber in a first configuration;
releasing the constituent gas from the thermal swing absorber in a second configuration and at a pressure that is substantially equal to the elevated nominal pressure; and
feeding the released constituent gas to a sorbent-assisted fluidized bed reactor of the high pressure gas-generation system and feeding a different type of gas than the released constituent to a calciner of the high pressure gas-generation system gas.

* * * * *